United States Patent [19]

Remillard et al.

[11] 4,322,992
[45] Apr. 6, 1982

[54] CHIP WASHING SYSTEM

[75] Inventors: Gerard J. Remillard, Lewisville; Frank Cruz, Sr., Dallas; Daniel W. Devoss, Jr., Mansfield; Truman A. Miller, Lewisville, all of Tex.

[73] Assignee: Otis Engineering Corporation, Dallas, Tex.

[21] Appl. No.: 145,894

[22] Filed: May 2, 1980

[51] Int. Cl.³ .......................... B23B 3/36; B23B 51/06
[52] U.S. Cl. ................................ 82/34 R; 82/DIG. 2; 408/56
[58] Field of Search .......... 82/DIG. 2, DIG. 1, 34 R; 408/61, 56, 705

[56] References Cited

U.S. PATENT DOCUMENTS

| | | | |
|---|---|---|---|
| 800,894 | 10/1905 | Baldwin | 82/DIG. 2 |
| 1,930,035 | 10/1933 | Bogart | 82/DIG. 2 |
| 2,092,101 | 9/1937 | Wickersham et al. | 82/DIG. 2 |
| 2,337,761 | 12/1943 | Millholland | 82/DIG. 2 |
| 2,395,101 | 2/1946 | Case | 82/DIG. 1 |
| 2,853,902 | 9/1958 | Dominquez | 82/34 R |
| 2,938,410 | 5/1960 | Carlstedt | 82/34 R |
| 3,094,023 | 6/1963 | Lamusga | 82/34 R |
| 3,486,209 | 12/1969 | Shultz et al. | |
| 3,845,532 | 11/1974 | Smith | |

FOREIGN PATENT DOCUMENTS

| | | | |
|---|---|---|---|
| 619570 | 5/1961 | Canada | 82/34 R |
| 562630 | 5/1957 | Italy | 408/56 |
| 789176 | 1/1958 | United Kingdom | 408/56 |
| 395184 | 12/1973 | U.S.S.R. | 408/56 |

OTHER PUBLICATIONS

Brochure–1000 PSI Rotating Hydraulic Cylinders, by The S-P Mfg. Corp., Copyright 1979.

Primary Examiner—Harrison L. Hinson
Attorney, Agent, or Firm—Thomas R. Felger

[57] ABSTRACT

A system for washing chips from the inside diameter of a workpiece. The chip washing system significantly improves the efficiency of a lathe used to machine the inside diameter of a workpiece having a longitudinal flow passage therethrough. The system injects a large volume of fluid into the end of the longitudinal flow passage opposite the end into which a machining tool or boring bar is inserted. The fluid flow removes metal chip cut from the inside diameter of the workpiece. The time that the machining tool or boring bar can be used without damage is increased by both increased cooling at the point of contact with the workpiece and preventing metal chips from becoming fouled around the boring bar.

9 Claims, 4 Drawing Figures

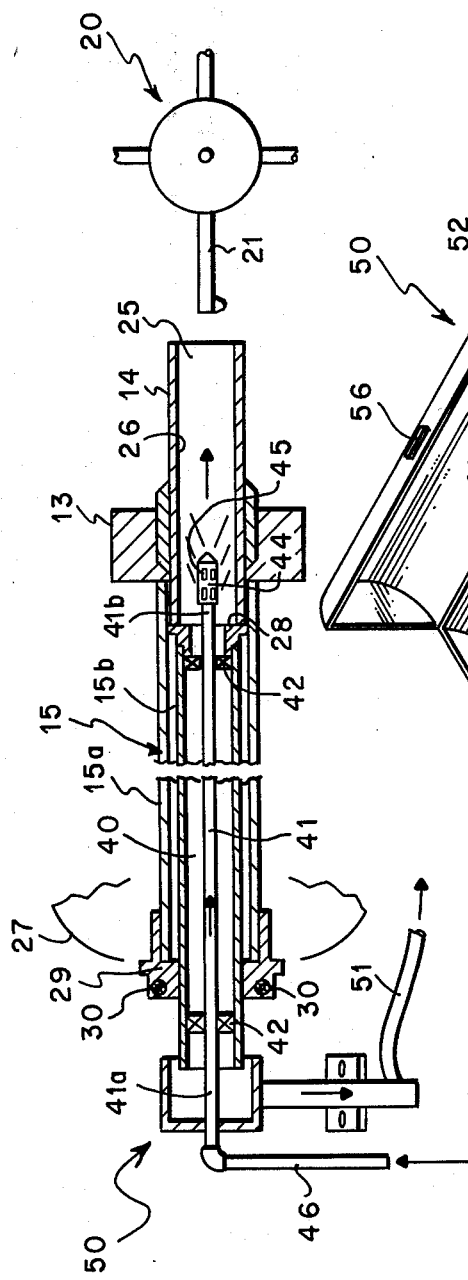
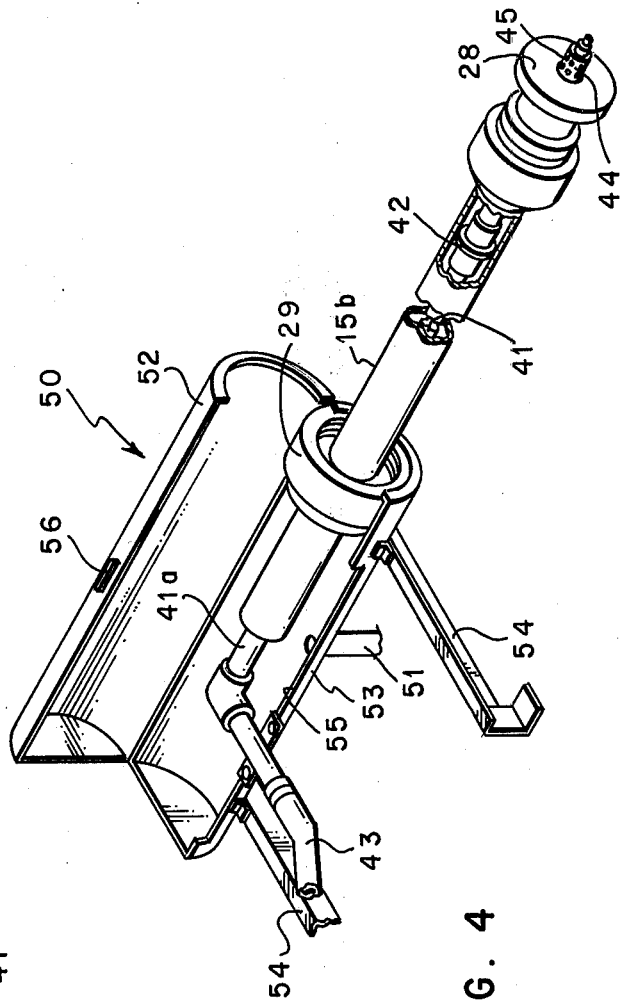
FIG. 3
FIG. 4

CHIP WASHING SYSTEM

BACKGROUND OF THE INVENTION

1. Field of the Invention

The present invention relates to a system for washing chips from a bore extending longitudinally through a workpiece while the inside diameter of the workpiece is being machined.

2. Description of the Prior Art

U.S. Pat. No. 3,486,209 to W. Shultz et al discloses a turret lathe with which the present invention can be utilized. It is well known to inject cooling fluid through a longitudinal passageway within a machining tool or boring bar as shown in U.S. Pat. No. 3,486,209 and out through a hole near the end of the tool adjacent to the point of contact between the tool and the workpiece. Cooling fluid is provided primarily to protect the cutting surfaces of the tool from excessive heat. However, the cooling fluid does to a limited extent remove metal chips cut from the inside diameter of the workpiece. The volume of fluid flow is restricted by the inside diameter of the longitudinal passageway and the small opening near the end of the tool. Any significant increase in the inside diameter of the longitudinal passageway or the opening results in a corresponding decrease in the strength of the tool. The outside diameter of the machining tool or boring bar is limited by the inside diameter of the workpiece.

The present invention can also be incorporated into the turret lathe shown in U.S. Pat. No. 3,845,532 as long as the spindle, which rotates the chuck holding the workpiece, has a hollow, longitudinal bore therethrough. U.S. Pat. Nos. 3,486,209 and 3,845,532 are incorporated by reference for all purposes within this application.

SUMMARY OF THE INVENTION

The present invention discloses a chip washing system for a lathe having a spindle, a chuck for holding a workpiece while being rotated by the spindle, and a longitudinal bore extending through the spindle, comprising a conduit disposed within the longitudinal bore of the spindle, the conduit having one end extending from the spindle exterior to the lathe and the other end extending from the spindle into a longitudinal flow passage defined by the inside diameter of the workpiece, means for preventing the conduit from rotating as the spindle rotates, and means for discharging fluid into the one end of the conduit and out the other end of the conduit.

One object of the present invention is to provide a system for a turret lathe to readily remove chips from the inside diameter of a longitudinal flow passage of a workpiece without having to stop rotation of the workpiece and manually clear the longitudinal flow passage.

Another object of the present invention is to provide increased coolant flow at the point of contact between a machining tool and a workpiece without decreasing the strength of the machining tool.

A further object of the present invention is to provide a coolant flow system which can be easily adjusted to accommodate workpieces with various lengths of longitudinal flow passages therethrough.

Still another object of the present invention is to eliminate the need for a longitudinal passageway through a boring bar used to machine the inside diameter of a workpiece. Elimination of the longitudinal passageway improves the strength and simplifies the design of the boring bar.

A still further object of the present invention is to improve the quality of the surface finish and dimensional tolerances within the inside diameter of a workpiece by thoroughly removing metal chips cut from the inside diameter.

Another advantage of the present invention is that one operator can monitor several lathes because the number of times each lathe must be stopped to clear metal chips from the inside diameter of the workpiece is reduced.

Other objects and advantages of the present invention will be readily apparent to those skilled in the art from reading the following detailed description in conjunction with the drawings and claims.

BRIEF DESCRIPTION OF THE DRAWINGS

FIG. 3 is a schematic drawing, partially in elevation and partially in section with portions broken away, showing the chip washing system of the present invention.

FIG. 4 is a schematic drawing with portions broken away showing an alternative configuration of the chip washing system.

DESCRIPTION OF THE PREFERRED EMBODIMENTS

Figure 1:
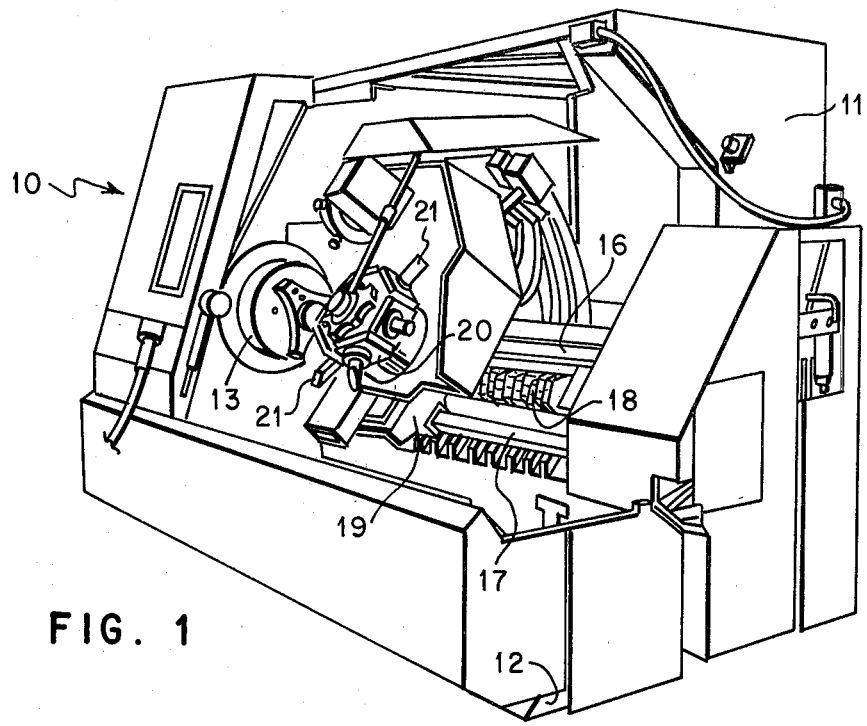
FIG. 1 is a drawing showing a turret lathe.

Referring to the drawings, turret lathe 10 is shown having a frame 11 supported on base 12. Spindle 15 and chuck 13 are also provided for holding and rotating workpiece 14. A motor (not shown) is provided to rotate spindle 15 and attached chuck 13. U.S. Pat. No. 3,845,532 discloses a motor, spindle and chuck arrangement satisfactory for use with the present invention.

Turret lathe 10 also includes sliding support member 19 mounted on rails 16 and 17. Support member 19 is longitudinally positioned with respect to chuck 13 by lead screw 18. Support member 19 carries turret 20 on which are mounted various machining tools or boring bars 21. As described in U.S. Pat. No. 3,486,209, turret 20 can be rotated to present various machining tools 21 to the end of workpiece 14 extending from chuck 13. If the workpiece has an appropriately sized opening, turret 20 can be positioned to insert machining tool 21 into the workpiece and machine the inside diameter of the workpiece.

The present invention can be used with various lathes and is not limited to turret lathe 10. As will be apparent from the following description, the chip washing system of the present invention can be used with any lathe that has a hollow spindle.

Workpiece 14 has a longitudinal flow passage 25 which extends therethrough and is partially defined by inside diameter 26. Boring bar 21 can be positioned to machine or cut metal from inside diameter 26 as workpiece 14 is rotated by spindle 15 and chuck 13. One system previously used to remove metal chips from longitudinal flow passage 25 consists of discharging fluid through a longitudinal passageway (not shown) in the boring bar and out through a hole near the point of contact between boring bar 21 and inside diameter 26.

The volume of fluid flow available to cool the cutting surface of boring bar 21 and to remove metal chips is thus limited by the inside diameter of the longitudinal passageway within boring bar 21.

Referring generally to FIG. 3, spindle 15 comprises two concentric tubular mandrels 15a and 15b. U.S. Pat. No. 3,845,532 shows various motor and gear configurations which can be used to rotate spindle 15 with respect to housing 27. Chuck 13 is rotatably attached to one end of outer mandrel 15a. Inner mandrel 15b is disposed within and rotated by outer mandrel 15a. Stop 28 is secured to one end of inner mandrel 15b within the bore of outer mandrel 15a. Stop 28 limits the length of workpiece 14 which can be inserted into chuck 13. Inner mandrel 15b is longitudinally slidable with respect to outer mandrel 15a to adjust the longitudinal spacing between stop 28 and chuck 13. End piece 29 transmits rotation of outer mandrel 15a to inner mandrel 15b. Bolts 30 can be loosened to allow longitudinal positioning of stop 28 as previously mentioned. For purposes of explanation, outer mandrel 15a is not shown in FIG. 4.

Figure 2:
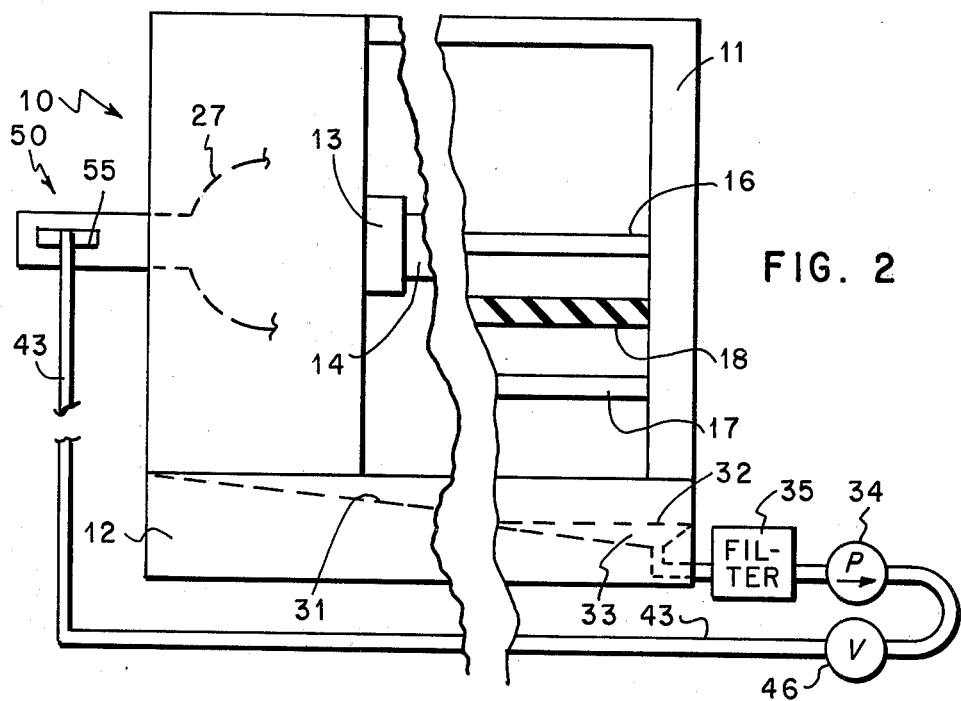
FIG. 2 is a schematic drawing in elevation with portions broken away showing the turret lathe of FIG. 1 modified to include the chip washing system of the present invention.

Base 12 supports chip pan 31, shown as a dotted line in FIG. 2. Metal chips and fluid flow out of longitudinal flow passage 25 and fall into chip pan 31. Chip pan 31 is sloped towards one end of base 12. Screen 32 is provided near the one end of base 12 covering fluid reservoir 33. Reservoir 33 can be merely a sump as shown in FIG. 2 or a separate storage tank depending upon the type of fluid used. Reservoir 33 collects fluid draining from longitudinal flow passage 25 in workpiece 14.

Pump 34 is shown with its inlet connected to reservoir 34. Filter 35 is disposed between reservoir 33 and the inlet to pump 34. Filter 35 and screen 32 comprise means for separating metal chips from the fluid.

Longitudinal bore 40 extends through inner mandrel 15b of spindle 15. Conduit or pipe 41 is disposed within longitudinal bore 40. One end 41a of conduit 41 extends from spindle 15 exterior to lathe 10. Other end 41b of conduit 41 extends from spindle 15 into longitudinal flow passage 25 of workpiece 14.

Bearing means 42 are disposed between the exterior of conduit 41 and the inside diameter of inner mandrel 15b. Bearing means 42 are longitudinally spaced from each other along the exterior of conduit 41. Bearing means 42 provide a means for preventing conduit 41 from rotating as spindle 15 rotates. Bearing means 42 may be fixed to the exterior of conduit 41 and slidable longitudinally with respect to the inside diameter of inner mandrel 15b. In the alternative, bearing means 42 may be fixed to the inside diameter of inner mandrel 15b with conduit 41 longitudinally slidable through the center of bearing means 41.

The outlet of pump 34 is connected by tubing 43 to one end 41a of conduit 41. Pump 34 and tubing 43 comprise means for discharging fluid into one end 41a and out the other end 41b of conduit 41. If desired, valve 46 can be installed within tubing 43 to control and regulate fluid flow therethrough.

Preferably, nozzle 44 is attached to the other end 41b of conduit 41. Holes 45 are drilled through the exterior of nozzle 44 to project fluid, discharged through conduit 41, radially outward against inside diameter 26.

Preferably, bearing means 42 form a fluid barrier between the exterior of conduit 41 and the inside diameter of inner mandrel 15b. The fluid barrier directs fluid flow through workpiece 14 and out the end of longitudinal flow passage 25 opposite stop 28.

Drain assembly 50 is mounted exterior to lathe 10 and surrounding the end of inner mandrel 15b to catch any fluid which escapes past bearing means 42. Tubing 51 returns fluid caught by drain assembly 50 to reservoir 33. FIGS. 3 and 4 disclose alternative constructions of assembly 50. As best shown in FIGS. 2 and 4, drain assembly 50 can be used to provide longitudinal and lateral support for conduit 41. Preferably, drain assembly 50 comprises two matching sections 52 and 53. Each section comprises half of a cylinder. Section 53 is mounted by frame 54 to frame 11 of lathe 10. Section 52 is hinged to section 53 and can be opened by lifting on handle 56. Section 53 preferably has a notch 55 formed on one side providing a support for tubing 43. The length of notch 53 is selected to allow conduit 41 to be positioned longitudinally with respect to workpiece 14 so that fluid projecting from nozzle 44 will have maximum efficiency for removing metal chips from inside diameter 26.

If desired, pump 34 and valve 46 could be electrically connected to the operating switch for lathe 10 such that when lathe 10 is started the chip washing system would automatically start. Also, a separate switch could be provided for pump 34 and/or valve 46 to stop the fluid flow when not required. Fluid flow might not be necessary when the outside diameter of workpiece 14 is being machined.

The present invention can be used with various types of lathes. The previous description is illustrative of only some of the embodiments of the invention. Those skilled in the art will readily see other variations for a chip washing system using the present invention. Changes and modifications may be made without departing from the scope of the invention which is defined by the claims.

We claim:

1. A chip washing system for a lathe having a spindle, a chuck for holding a workpiece while being rotated by the spindle, and a longitudinal bore extending through the spindle, comprising:
   a. a conduit disposed within the longitudinal bore of the spindle;
   b. the conduit having one end extending from the spindle exterior to the lathe and the other end extending from the spindle into a longitudinal flow passage defined partially by the inside diameter of the workpiece;
   c. means for preventing the conduit from rotating as the spindle rotates; and
   d. means for discharging fluid into the one end of the conduit and out the other end of the conduit.

2. A chip washing system, as defined in claim 1, further comprising:
   a. nozzle means attached to the other end of the conduit; and
   b. holes through the exterior of the nozzle to project the fluid radially outward against the inside diameter of the workpiece.

3. A chip washing system, as defined in claim 1, wherein the means for preventing rotation of the conduit further comprises:
   a. bearings disposed between the exterior of the conduit and the inside diameter of the spindle; and
   b. a drain assembly for catching any fluid which flows out the end of the spindle exterior to the lathe.

4. A chip washing system, as defined in claim 3, with the bearings longitudinally slidable with respect to the inside diameter of the spindle.

5. A chip washing system, as defined in claim 3, further comprising:
 a. the conduit longitudinally slidable within the bearings; and
 b. the drain assembly supporting longitudinal movement of the one end of the conduit.

6. A chip washing system for a lathe having a hollow spindle with openings at each end, a chuck for holding a workpiece while being rotated by the spindle, and a longitudinal flow passage extending through the workpiece, comprising:
 a. a conduit slidably disposed within the hollow spindle;
 b. the conduit having one end extending from the spindle exterior to the lathe and the other end extending from the spindle into the longitudinal flow passage of the workpiece;
 c. means for preventing rotation of the conduit as the spindle rotates;
 d. means for discharging fluid into the one end of the conduit and out the other end of the conduit; and
 e. means for projecting the fluid radially outward against the inside diameter of the workpiece defining the longitudinal flow passage.

7. A chip washing system, as defined in claim 1 or 6, wherein the means for discharging fluid further comprises:
 a. reservoir means for collecting fluid draining from the longitudinal flow passage in the workpiece;
 b. means for separating metal chips from the fluid; and p1 c. a pump with its inlet connected to the reservoir means and its outlet connected to the one end of the conduit.

8. A chip washing system, as defined in claim 6, wherein the means for preventing rotation of the conduit comprises:
 a. bearing means disposed between the exterior of the conduit and the inside diameter of the spindle;
 b. the bearing means allowing the conduit to slide longitudinally with respect to the spindle and to allow positioning the other end of the conduit at a desired location with respect to the workpiece; and
 c. the bearing means forming a fluid barrier between the exterior of the conduit and the inside diameter of the spindle.

9. A chip washing system, as defined in claim 8, wherein the means for preventing rotation of the conduit further comprises:
 a. a drain assembly for catching any fluid which flows out of the end of the spindle exterior to the lathe; and
 b. the drain assembly supporting longitudinal movement of the conduit.

* * * * *